THERMALLY SENSITIVE RESISTANCES

Filed Jan. 25, 1962

Inventors:
Lewis R. Koller;
Henry D. Coghill,
by Joseph V. Claeys
Their Attorney.

United States Patent Office 3,188,594

Patented June 8, 1965

3,188,594
THERMALLY SENSITIVE RESISTANCES

Lewis R. Koller, Cambridge, Mass., and Henry D. Coghill, Burnt Hills, N.Y., assignors to General Electric Company, a corporation of New York Filed Jan. 25, 1962, Ser. No. 168,662
4 Claims. (Cl. 338—28)

This invention relates generally to thermally sensitive resistance devices and more particularly to such devices prepared from thin semiconductive films.

Thermally sensitive resistance devices wherein the resistance decreases with increase in temperature are well-known in the art. Such devices are referred to as having negative temperature coefficients of resistance. The most extensively used materials for present day devices of this type have been the oxides of manganese, nickel, and cobalt. These oxides are mixed in various proportions to provide, from a single system, a material having a wide range of specific resistances and temperature coefficients. Such commercial thermally sensitive resistance devices are available with negative temperature coefficients of resistance in the range of about 2.4 to 4.4 percent per degree centigrade. For greater sensitivity, however, it would be highly desirable to obtain such devices having larger negative temperature coefficients of resistance. It would also be desirable to utilize less complex materials.

Although many other semiconductive materials have been known to exhibit large temperature coefficients of resistance, the very large variation in resistance of these materials with even extremely small amounts of certain impurities has largely discouraged their use in making thermally sensitive devices. For example, in order to assure the required uniformity of electrical properties in devices of this type, the semiconductive material should be extremely pure. For such extremely pure semiconductive material, however, esentially only intrinsic conductivity is present. Very often, therefore, such intrinsic semiconductive material has such a high room temperature resistivity that it is unsatisfactory for use in the fabrication of useful and practical thermally sensitive resistance devices.

It is an object of this invention to provide thermally sensitive resistance devices having improved electrical properties.

It is another object of this invention to provide thermally sensitive resistance devices exhibiting significantly larger temperature coefficients of resistance than heretofore possible in practical devices of this type.

It is a further object of this invention to provide thermally sensitive resistance devices which may be conveniently, reliably, and economically produced having a wide range of resistance values at room temperature.

It is still another object of this invention to provide thermally sensitive resistance devices having large negative temperature coefficients of resistance and resistance values in the range of about 100 ohms to about 10 million ohms.

Briefly stated, in accordance with one aspect of this invention, thermally sensitive resistance devices exhibiting large negative temperature coefficients of resistance comprise a crystalline film of essentially intrinsic semiconductive material having a thickness in the range of about $10^{-6}$ to $10^{-1}$ centimeters. The semiconductive material of such film is selected from the group consisting of zinc telluride, cadmium telluride and zinc-cadmium telluride. Such devices may be readily provided which exhibit resistance values in the range of about 100 ohms to 10,000,000 ohms and negative temperature coefficients of resistance of at least about 8 percent per degree centigrade.

As used throughout the specification and in the appended claims the term "essentially intrinsic conductivity" refers to extremely pure semiconductive material wherein the conductivity is due substantially to the intrinsic properties of the particular semiconductive material itself, as well as to such semiconductive material wherein although impurities are present there is a balance in concentrations of donor and acceptor impurities such that the particular semiconductive material exhibits a similar intrinsic conductivity. For example, if the impurities are such that the Fermi-level is located midway between the valence and conduction band edges the semiconductive material would exhibit a suitable intrinsic conductivity.

The novel features believed characteristic of this invention are set forth with particularity in the appended claims. The invention itself, however, both as to its organization and method of operation, together with further objects and advantages thereof, may best be understood by reference to the following description taken in conjunction with the accompanying drawing in which:

Figure 1:
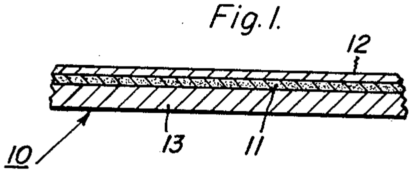
FIGURE 1 is a diagrammatic sectional view, greatly enlarged, of one embodiment of a thermally sensitive resistance device in accordance with this invention.

In FIGURE 1 a thermally sensitive resistance device, generally designated at 10, includes a crystalline, essentially intrinsic semiconductive layer 11 having conducting electrodes 12 and 13 disposed in electrical contact with opposite sufaces thereof. Layer 11 is composed of a semiconductive material selected from the group consisting of zinc telluride, cadmium telluride and zinc-cadmium telluride, and preferably of cadmium telluride, having a thickness in the range of about $10^{-6}$ to $10^{-1}$ centimeters. Although the above semiconductive materials are extremely difficult to prepare in sufficiently pure form so as to exhibit essentially only intrinsic conductivity at room temperature, we have discovered that thin vacuum deposited films of such materials exhibit essentially intrinsic conductivity at room temperature. For example, such a vacuum deposited layer of cadmium telluride is found to have a room temperature resistivity of about $10^8$ ohm centimeters which is essentially intrinsic. Preferably, therefore, the layer 11 comprises a vacuum deposited film of the selected semiconductive material. In addition, it is preferred to utilize cadmium telluride because of its lower room temperature resistivity.

The thermally sensitive resistance devices of this invention may be conveniently constructed by techniques well-known in the art such as for example, vacuum evaporation, cathodic sputtering, vapor reaction and the like. Since these vacuum deposition techniques are so well-known in the art, they will not be further described herein. In this respect, however, the semiconductive material should be deposited onto a heated substrate. The temperature of the substrate should be at least about 100° C. and preferably in the range of about 200° C. to 700° C.

In constructing a thermally sensitive resistance device in accordance with our present invention for example, conductive electrode 13 may be a conducting substrate such as a base plate of silver, molybdenum or similar electrically conducting material. Alternatively, the substrate 13 may be composed of a non-conducting material such as glass, sapphire, or the like having at least one electrically conducting surface provided thereon. Such electrically conducting surface may be, for example, a layer of tin oxide or a similar electrically conducting film.

The substrate is heated to a temperature in the range of about 200° C. to 700° C., a layer 11 of a semiconductive material selected from the group consisting of zinc telluride, cadmium telluride and zinc-cadmium telluride is vacuum deposited onto one electrically conductive surface of electrode 13, as by evaporation in vacuo, to a thickness in the range of about $10^{-6}$ to $10^{-1}$ centimeters. The semiconductive compound itself may be vacuum evaporated or the individual constituents may be simultaneously evaporated. In either case the deposited layer is the desired semiconductive compound exhibiting essentially intrinsic conductivity at room temperature. The remaining electrode 12 is therefore vacuum deposited onto the surface of the semiconductive layer 11, in well-known manner, to complete the device. Preferably, especially for the thicker semiconductive layers, conducting substrate 13 is of a material having a thermal expansion coefficient approximately equal to that of the semiconductive material to be deposited thereon.

The particular thickness of vacuum deposited semiconductive layer 11 is determined by the desired resistance of the device being constructed. For example, the resistance R of the device is determined by the following relationship:

$$R=\frac{\rho l}{s}$$

where:

$\rho$=resistivity of the semiconductive material of layer 11
$l$=the path length between the electrodes
$s$=area of the semiconductive material between electrodes.

Thus, a device about one centimeter square, comprising cadmium telluride semiconductive material having an intrinsic room temperature resistivity of about $10^8$ ohm centimeters, will exhibit a resistance at room temperature of as low as about 100 ohms when layer 11 has a thickness of about $10^{-6}$ centimeters. A similar device, on the other hand, will exhibit a room temperature resistivity of about 10 million ohms when layer 11 has a thickness of about $10^{-1}$ centimeters. Devices may be readily provided having resistances over a wide range of values by a suitable selection of the size of the device and thickness of the layer 11.

Figure 2:
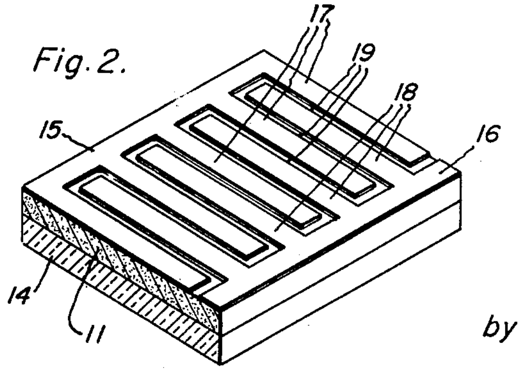
FIGURE 2 is a perspective view of an illustration of a suitable interdigital electrode arrangement suitable for use in constructing devices of this invention.

FIGURE 2 is a perspective view of an illustration of a suitable interdigital electrode arrangement suitable for use in constructing devices of this invention. In FIGURE 2 the device includes an insulating substrate 14 such as glass, sapphire or the like, a vacuum deposited layer 11 of a semiconductive material selected from the group consisting of zinc telluride, cadmium telluride and zinc-cadmium telluride having a thickness in the range of about $10^{-6}$ to $10^{-1}$ centimeters, and electrodes 15 and 16 disposed on the surface thereof. Electrodes 15 and 16 include spaced-apart portions 17 and 18 respectively. The electrodes 15 and 16 are arranged on the surface of layer 11 to provide that the spaced-apart portions thereof are in alternate spaced-apart relationship on the surface of layer 11.

The resistance of devices utilizing the electrode arrangement illustrated in FIGURE 2 is determined in general by the same relationship as that shown for the devices constructed in accordance with FIGURE 1 with appropriate modifications. That is, the resistance is determined by the relationship:

$$R=\frac{\rho l}{ns}$$

where however, $\rho$=the resistivity of the particular semiconductive material
$l$=the path length which is now the distance 19 between electrode portions 17 and 18
$s$=the cross-sectional area of the semiconductive material between the electrode portions 17 and 18, and
$n$=the number of parallel paths formed by the plurality of spaced-apart electrode portions.

In the electrode arrangement shown in FIGURE 2, therefore, the number of parallel paths as well as the length of the electrode portions 17–18, the spacing therebetween and the thickness of layer 11 all contribute to the exhibited resistance value of the completed device. In many instances such an electrode arrangement has many advantages and may be preferred over devices constructed from parallel plane electrodes on opposite surfaces of a semi-conductive layer 11 as shown in FIGURE 1. Devices having a wide range of resistance values may be readily provided by suitable selection of the respective parameters.

For example, one specific thermally sensitive resistance device, having an interdigital electrode arrangement which provided 14 parallel paths, with a cadmium telluride layer of about $2.5\times10^{-3}$ centimeters in thickness exhibited a resistance at room temperature of about $7.7\times10^{7}$ ohms. The particular electrode arrangement included 15 spaced-apart electrode portions, each about 1.8 centimeters long, 0.05 centimeter wide, and spaced about 0.05 centimeter. A similar device, on the other hand, having only two parallel paths formed by similarly dimensioned and spaced electrode portions would exhibit a resistance at room temperature of about $1.0\times10^{9}$ ohms.

Figure 3:
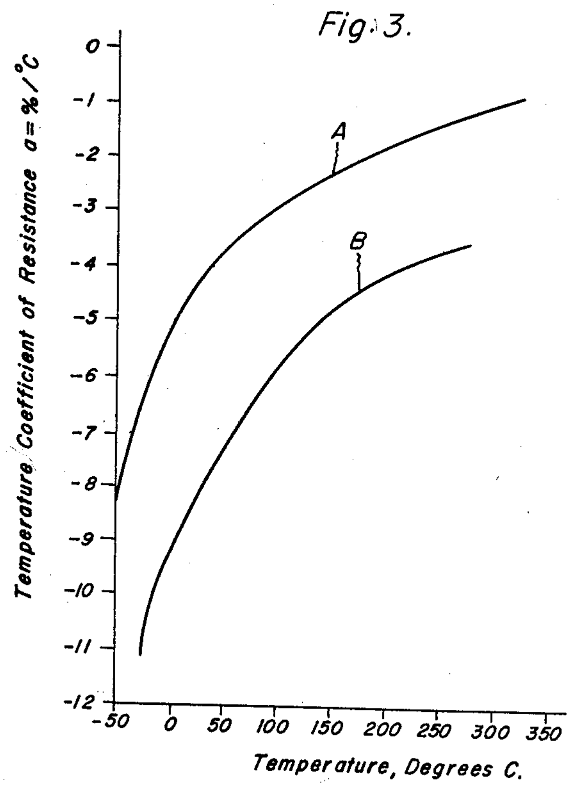
FIGURE 3 is a plot of the temperature coefficient of resistance as a function of temperature for a typical prior art thermally sensitive resistance device compared to that of a typical device of this invention.

Curve A in FIGURE 3 illustrates the temperature coefficient of resistance as a function of temperature for a typical prior art thermally sensitive resistance device composed of manganese and nickel oxides while curve B illustrates the temperature coefficient of resistance of a typical cadmium telluride thermally sensitive resistance of this invention. The higher temperature coefficient of resistance of the devices of this invention is clearly shown by a comparison of the two curves. For example, at about 25° C. the temperature coefficient of resistance of the prior art device illustrated by curve A is about −4.4 percent per degree whereas at the same temperature the temperature coefficient of resistance of the cadmium telluride device of this invention is about −8.4 percent per degree.

There has been described hereinbefore, therefore, new thermally sensitive resistance devices employing a single semiconductive material rather than complex mixtures of various oxides. The temperature coefficient of devices of this invention is larger than heretofore known in prior art devices of this type. Further, devices in accordance with this invention may be conveniently provided having a wide range of resistance values.

While this invention has been described with respect to specific examples and certain preferred embodiments, many changes and modifications will occur to those skilled in the art. It is, therefore, to be understood that the appended claims are intended to cover all such changes and modifications as fall within the true spirit and scope of the invention.

What we claim as new and desire to secure by Letters Patent of the United States is:

1. A thermally sensitive resistance device comprising: a continuous crystalline film of substantially intrinsic semiconductive material having a thickness in the range of about $10^{-6}$ to $10^{-1}$ centimeters and exhibiting a negative temperature coefficient of resistance of at least 4% per centigrade degree throughout the temperature range of 0° C. to 200° C., said semiconductive material selected from the group consisting of zinc telluride, cadmium telluride and zinc-cadmium telluride; and electrodes disposed on opposite surfaces of said film.

2. The thermally sensitive resistance device of claim 1 wherein said film is zinc telluride.

3. The thermally sensitive resistance device of claim 1 wherein said film is cadmium telluride.

4. The thermally sensitive resistance device of claim 1 wherein said film is zinc-cadmium telluride.

(References on following page)

References Cited by the Examiner

UNITED STATES PATENTS

| | | | |
|---|---|---|---|
| 2,743,430 | 4/56 | Schultz et al. | 252—501 |
| 2,765,385 | 10/56 | Thomsen | 338—15 |
| 2,847,544 | 8/58 | Taft et al. | 338—28 |
| 2,865,794 | 12/58 | Kroger et al. | 117—200 |
| 2,868,736 | 1/59 | Weinrich | 252—501 |
| 2,994,621 | 8/61 | Hugle et al. | 252—501 |
| 3,012,212 | 12/61 | Hicks | 338—18 |
| 3,033,791 | 5/62 | Nobel et al. | 252—301.65 |

RICHARD M. WOOD, *Primary Examiner.*